US006816172B1

(12) United States Patent
Iki et al.

(10) Patent No.: US 6,816,172 B1
(45) Date of Patent: Nov. 9, 2004

(54) GRAPHICAL USER INTERACE WITH MULTIMEDIA IDENTIFIERS

(75) Inventors: Jean M. Iki, San Jose, CA (US); Anthony Alexander Shah-Nazaroff, Santa Clara, CA (US); Christopher D. Williams, Soquel, CA (US); Kathleen Lane, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/939,185

(22) Filed: Sep. 29, 1997

(51) Int. Cl.⁷ .............................................. G06F 3/00
(52) U.S. Cl. ........................................ 345/716; 725/25
(58) Field of Search ................................. 345/716, 763, 345/764, 327, 328, 353, 357, 761, 700, 762; 725/25, 26, 27; 348/906, 7, 12, 13, 10, 563, 564, 565; 455/5.1, 6.2, 6.3; 707/10, 104

(56) References Cited

U.S. PATENT DOCUMENTS

| | | | |
|---|---|---|---|
| 4,751,578 A | * | 6/1988 | Reiter et al. ................. 348/564 |
| 5,038,211 A | | 8/1991 | Hallenbeck |
| 5,550,576 A | | 8/1996 | Klosterman |
| 5,553,311 A | | 9/1996 | McLaughlin et al. |
| 5,574,964 A | | 11/1996 | Hamlin |
| 5,579,055 A | * | 11/1996 | Hamilton et al. ........... 348/906 |
| 5,583,560 A | | 12/1996 | Florin et al. |
| 5,583,561 A | * | 12/1996 | Baker et al. .................... 348/7 |
| 5,585,838 A | * | 12/1996 | Lawler et al. ................ 348/13 |
| 5,589,892 A | * | 12/1996 | Knee et al. .................. 346/731 |
| 5,619,249 A | | 4/1997 | Billock et al. |
| 5,640,453 A | | 6/1997 | Schuchman et al. |
| 5,675,390 A | | 10/1997 | Schindler et al. |
| 5,784,095 A | | 7/1998 | Robbins et al. |
| 5,805,235 A | * | 9/1998 | Bedard ........................ 348/906 |
| 5,809,204 A | * | 9/1998 | Young et al. ................ 348/906 |
| 5,889,506 A | * | 3/1999 | Lopresti et al. ............. 345/158 |

* cited by examiner

Primary Examiner—Cao (Kevin) Nguyen
(74) Attorney, Agent, or Firm—Blakely, Sokoloff, Taylor & Zafman LLP

(57) ABSTRACT

A graphical user interface for displaying entertainment system data includes a first multimedia identifier that is selectable to deliver entertainment system data stored at a first location relating to an entertainment selection. The graphical user interface also includes a second multimedia identifier that is selectable to deliver entertainment system data stored at a second location relating to the entertainment selection.

27 Claims, 7 Drawing Sheets

GRAPHICAL USER INTERACE WITH MULTIMEDIA IDENTIFIERS

FIELD OF THE INVENTION

The present invention relates to the field of entertainment systems. Specifically, the present invention relates to graphical user interfaces (GUI) in entertainment systems that display entertainment system data.

BACKGROUND OF THE INVENTION

A current trend in the electronics and computer industry is the convergence of computer systems and more traditional entertainment system components. As this convergence continues, more components in these systems will be combined together resulting in an increase in entertainment selections and entertainment system data available to users.

Current mechanisms for storing and providing entertainment system data to users are component specific. For example, programming guides made available by many cable companies provide some entertainment system data relating to programming selections available to the users. Typically, the programming guides provide an on-screen display of programming information for channels supported by the cable system. The programming guides, however, do not store or display entertainment system data from sources other than the cable company to the user. Thus, for example, if a user's entertainment system includes a direct broadcast satellite (DBS) receiver, a vertical blanking interval (VBI) decoder, a modem, or a video library, the entertainment system data from these sources and entertainment system data of entertainment selections from these sources would not be available to the user on the cable system's programming guide. In addition, the programming guides typically display limited information about a program selection. The information is usually limited to the title of the programming selection, agent 310 manages the organization and retrieval of the entertainment system data in the database 320, and presents the entertainment system data to users. The system control agent 310 includes a data parser 311, data engine 312, and query interface 313.

SUMMARY

A graphical user interface for displaying entertainment system data according to an embodiment of the present invention is disclosed. The graphical user interface includes a first multimedia identifier that is selectable to deliver entertainment system data stored at a first location relating to an entertainment selection. The graphical user interface also includes a second multimedia identifier that is selectable to deliver entertainment system data stored at a second location relating to the entertainment selection.

BRIEF DESCRIPTION OF THE DRAWINGS

The present invention is illustrated by way of example and not by way of limitation in the figures of the accompanying drawings, in which like references indicate similar elements and in which:

FIG. 4 illustrates entertainment system data records stored in a database according to an embodiment of the present invention;

DETAILED DESCRIPTION

Figure 1:
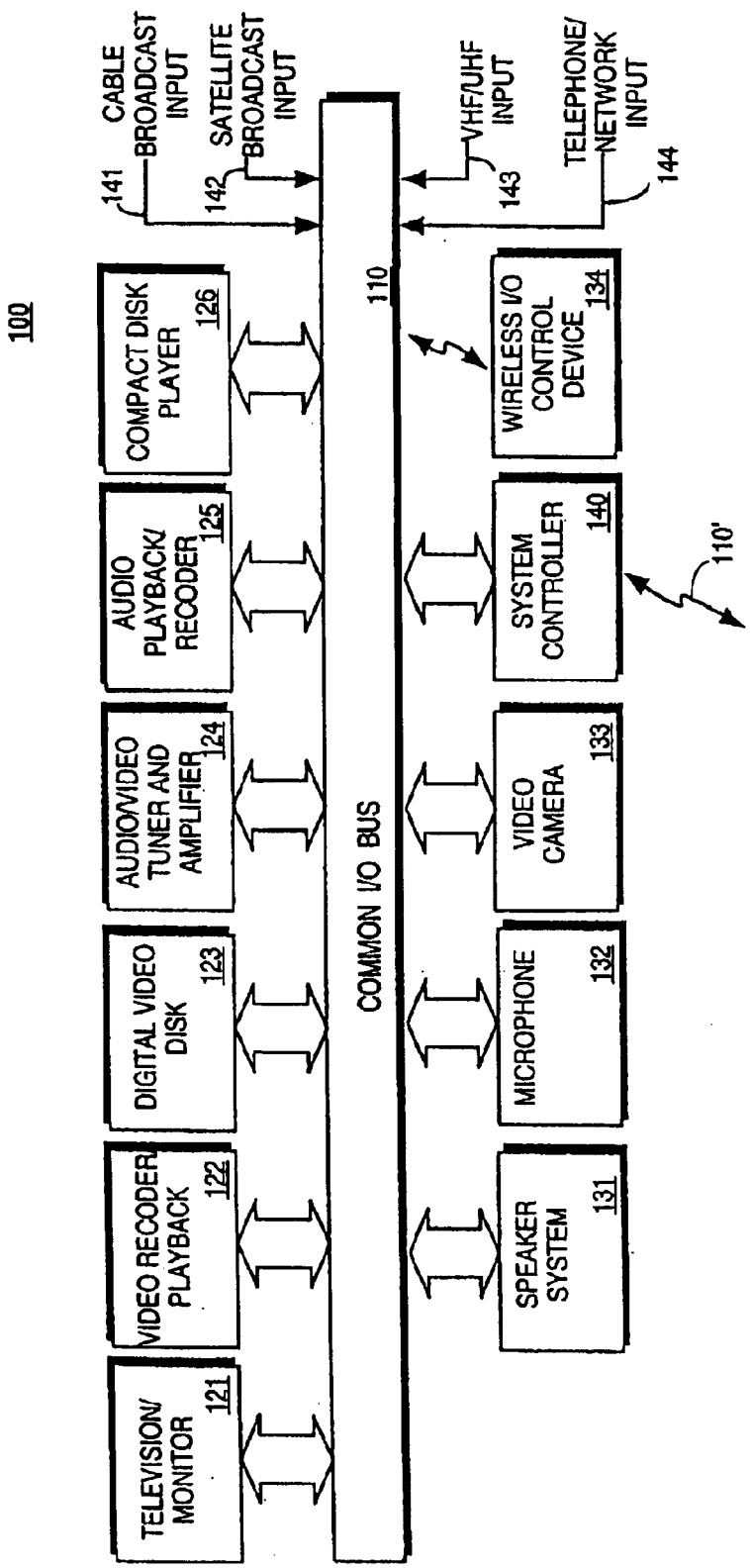
FIG. 1 is a block diagram illustrating the system components of one embodiment of an entertainment system according to the present invention.

FIG. 1 is a block diagram illustrating system components of an entertainment system 100 according to one embodiment of the present invention. The entertainment system includes a common input/output (I/O) bus 110 that connects the system components in the entertainment system 100 together. It should be appreciated that the common I/O bus 110 is illustrated to simplify the routing of signals between the computer system components. The common I/O bus 110 may represent a plurality of known mechanisms and techniques for routing I/O signals between the computer system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the entertainment system 100 includes a speaker system 131, microphone 132, video camera 133, and a wireless I/O control device 134. In one embodiment, wireless I/O control device 134 is an entertainment system remote control unit which communicates with the components of the entertainment system 100 through IR signals. In another embodiment, wireless I/O control device 134 may be a wireless keyboard and cursor positioning device that communicates with the components of entertainment system 100 through IR signals or RF signals. In yet bother embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 100 also includes a system controller 140. According to one embodiment of the present invention, the system controller 140 operates to store and display entertainment system data available from a plurality of entertainment system data sources. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110. Regardless of the control medium, the system controller 140 is configured to control one or more of the entertainment system components of the entertainment system 100, although it is understood that each of the components may be individually controlled with wireless I/O control device 134.

As illustrated in FIG. 1, system 100 may be configured to receive entertainment system data from a wide variety of entertainment system data sources. In one embodiment, entertainment system 100 receives programming input from any or all of the following sources: cable broadcast 141 (including from the vertical blanking interval (VBI), or a separate channel), satellite broadcast 142 (e.g., via a satellite dish), very high frequency (VHF) or ultra high frequency (UHF) radio frequency communication of the broadcast networks 143 (e.g., via an aerial antenna), telephone/computer network interface 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
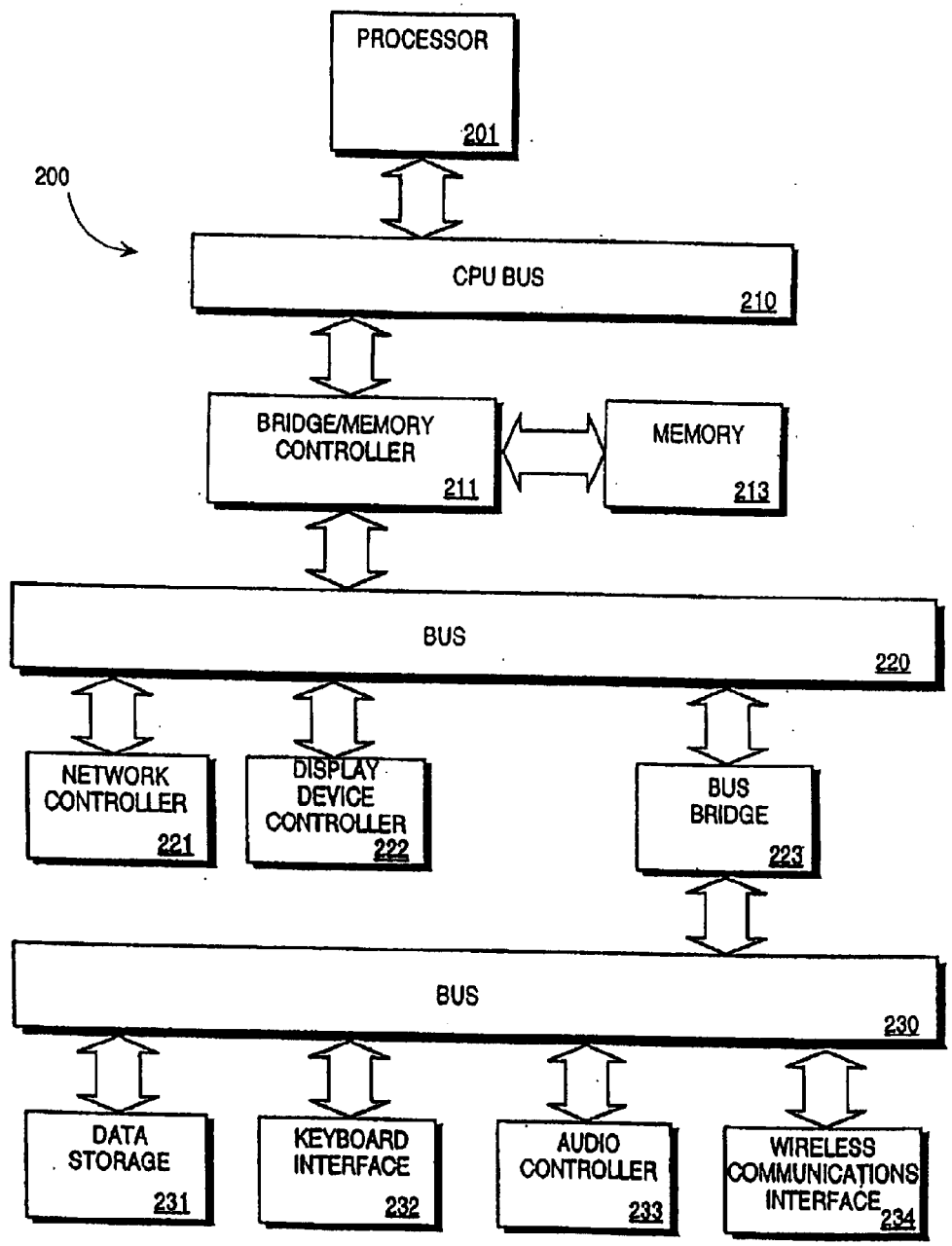
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201.

A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 links the computer system 200 to a network of computers and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. A data storage device 231 may be a hard disk drive, a floppy disk drive, a CD-ROM device, a flash memory device or other mass storage device. An audio controller 233 operates to coordinate the recording and playing of sounds is also coupled to the I/O bus 230. A wireless communications interface 234 may be an IR transceiver or a RF transceiver for transmitting and receiving signals between system components of the entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, configuring a graphical user interface that presents entertainment system data with multimedia identifiers is performed by the computer system 200 in response to the processor 201 executing sequences of instructions contained in the memory 213. Such instructions may be read into the memory 213 from other computer-readable media such as data storage device 231 or from a computer connected to the network via the network controller 211. Execution of the sequences of instructions contained in the memory 213 causes the processor to configure a graphical user interface that presents the entertainment system with multimedia identifiers, as will be described hereafter. In alternative embodiments, hard-wire circuitry may be used in place of or in combination with software instructions to implement the present invention. Thus, the present invention is not limited to any specific combination of hardware circuitry and software.

Figure 3:
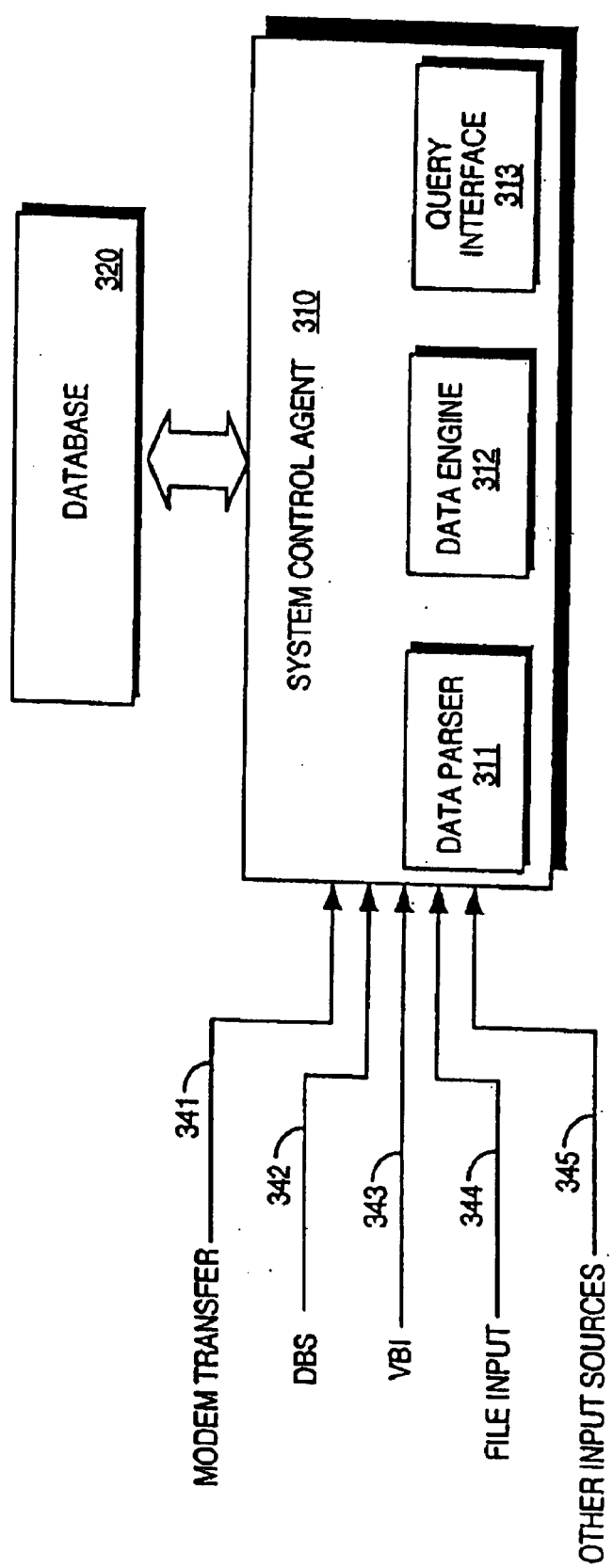
FIG. 3 is a block diagram of modules implementing an embodiment of the present invention.

FIG. 3 is a block diagram illustrating modules that implement an embodiment of the present invention. The modules may be implemented by software, hardware, or a combination of both hardware and software. Block 310 represents a system control agent that receives entertainment system data from multiple sources. The system control agent 310 manages the organization and retrieval of the entertainment system data in the database 320, and presents the entertainment system data to users. The system control agent 310 includes a data parser 311, data engine 312, and query interface 313.

Entertainment system data may be received by the system control agent 310 from a plurality of sources. These sources may include modem transfer 341, DBS 342, VBI 343, file input stream, 344, or other input streams 345. Modem transfer source 341 provides entertainment system data obtained from remote systems via a conventional modem. According to one embodiment of the present invention, the remote systems are host systems accessed via a n twork such as a web server accessed via the Internet or "dial-up" systems accessed via a plain old telephone service (POTS) or an integrated services digital network (ISDN) line. DBS source 342 provides entertainment system data obtained via a digital broadcast and a digital satellite receiver. According to one embodiment of the present invention, the entertainment system data is received via a separate digital channel by the DBS receiver. VBI source 343 provides entertainment system data from the vertical blanking interval of a television broadcast. The entertainment system data is decoded from the VBI of the television broadcast by a VBI decoder. File input stream 344 provides entertainment system data obtained from a computer file. The file may be located locally on the computer system. The file may contain, for example, a video clip, a movie review, a video game or other application. Other input streams 345 represent other conventional sources from which entertainment system data could be obtained. It is to be appreciated that any other conventional medium could be used to provide entertainment system data to system control agent 310, including RF broadcasts, ultrasonic broadcasts, IR broadcasts, or other broadcasts. It should also be appreciated that entertainment system data may be provided by the users manually. Entertainment system data may be obtained from any one or more of the sources 341–345. The entertainment system data obtained from a source need not specify programs or applications that are obtained from that same source.

Entertainment system data includes data related to entertainment selections. The entertainment selections may include programs, music selections, software applications, files, and other selections that may be made available to users via the entertainment system 100 (shown in FIG. 1). Entertainment system data may include information describing an entertainment selection or other information related to the entertainment selection. Examples of entertainment system data include television program information, radio station information, "video-on-demand" program information, laser disc availability, compact disk availability, DVD availability, CD-ROM availability, VHS or 8 mm tape availability, software application titles, Intercast™ broadcasts information, network identifiers such as Uniform Resource Locators (URLs), or other data.

Figure 4:
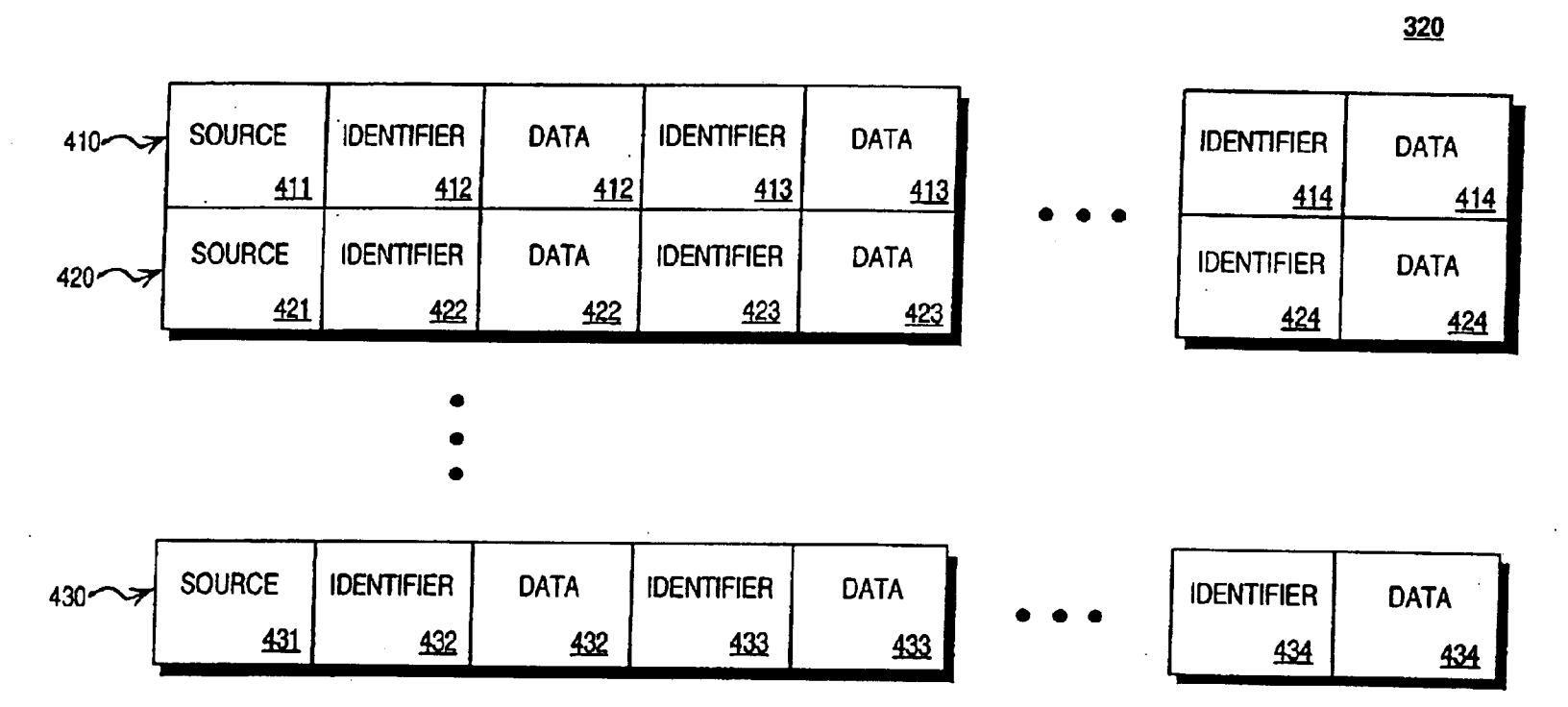

In the illustrated embodiment, entertainment system data received from each of the sources 341–345 are in a different, source specific format. Data parser 311 receives the entertainment system data from the sources 341–345 and translates the entertainment system data into a unitary format. The entertainment system data received from the sources 341–345 may include a plurality of information related to an entertainment selection. The data parser 311 generates a record for data corresponding to each entertainment selection. Within each record, the data parser 311 organizes the entertainment system data related to each entertainment selection into traits. Each trait includes an identifier portion that provides a generic description of the trait and a data portion that provides specific data related to the trait or a location of where the specific data may be found. According to one embodiment of the present invention, an identifier portion may be "Title", "Actors", or "Source of Programming" and the data portion may be the title of a movie, actors appearing in the movie, and the station where the movie may be viewed. According to another embodiment of the present invention, the identifier portion may be "Program Theme Song", "Video Trailer", "Audio Trailer", "Images of Cast", "Program's Home Page", "Program's Newsgroup", or "Articles about the Program and Cast" and the data portion may include a location of where the information relating to the identifier may be found. For example, the data portion may include a location such as a local address of a graphics file or an audio file stored in the data storage device 231 (shown in FIG. 2) that may be executed. Alternatively, the data portion may include a location such as an Internet address or an URL of a web server that includes a file that contains the information listed in the identifier portion The data engine 312 receives the entertainment data in the unitary format from the data parser 311 and stores the entertainment system data in the database 320. FIG. 4 illustrates entertainment system data records stored in a database 320 according to an embodiment of the present invention, wherein database 320 includes multiple records 410, 420, and 430. Each of the records 410, 420, and 430 includes a source identifier 411, 421, and 431, respectively. The source identifiers identify sources from which entertainment system data was received to generate the record. It should be appreciated that a record may include entertainment system data received from one or more sources. Each of the records 410, 420, and 430 are shown to include a plurality of traits. It should be appreciated that each record may include any number of traits. Record 410 includes traits 412, 413, and 414. Record 420 includes traits 422, 423, and 424. Record 430 includes traits 432, 433, and 434. Each of the traits includes an identifier portion and a data portion. In an alternate embodiment of the present invention, the records 410, 420, and 430 do not include source identifiers. Referring back to FIG. 3, it should be appreciated that the data parser 311 may organize the entertainment system data using any known technique into any known format and that the data engine 312 may configure the database 320 according to any known format.

The query interface 313 configures a graphical user interface that allows a user to access the entertainment system data stored in the database 320. According to an embodiment of the present invention, the query interface 313 presents the entertainment system data stored in the database 320 in text form. According to another embodiment of the present invention, the query interface 313 presents the entertainment system data stored in the database 320 using multimedia identifiers that may include graphical images, animation, audio clips, or other multimedia identifiers. For example, the query interface 313 may present the identifiers of traits of an entertainment selection using the multimedia identifiers and make the multimedia identifiers user selectable. When a graphical image corresponding to an identifier is selected, the query interface 313 retrieves information in the data portion corresponding to the identifier and presents it to the user. According to an embodiment of the present invention, presenting the information to the user may include displaying the information stored in the data section when the information is specific data related to the trait. According to another embodiment of the present invention, presenting the information may include using the information in the data section to locate additional information when the information is a location. In this embodiment, the multimedia identifier may be a hyper link to a remote web server or a link to a system component local to the graphical user interface.

Figure 5:
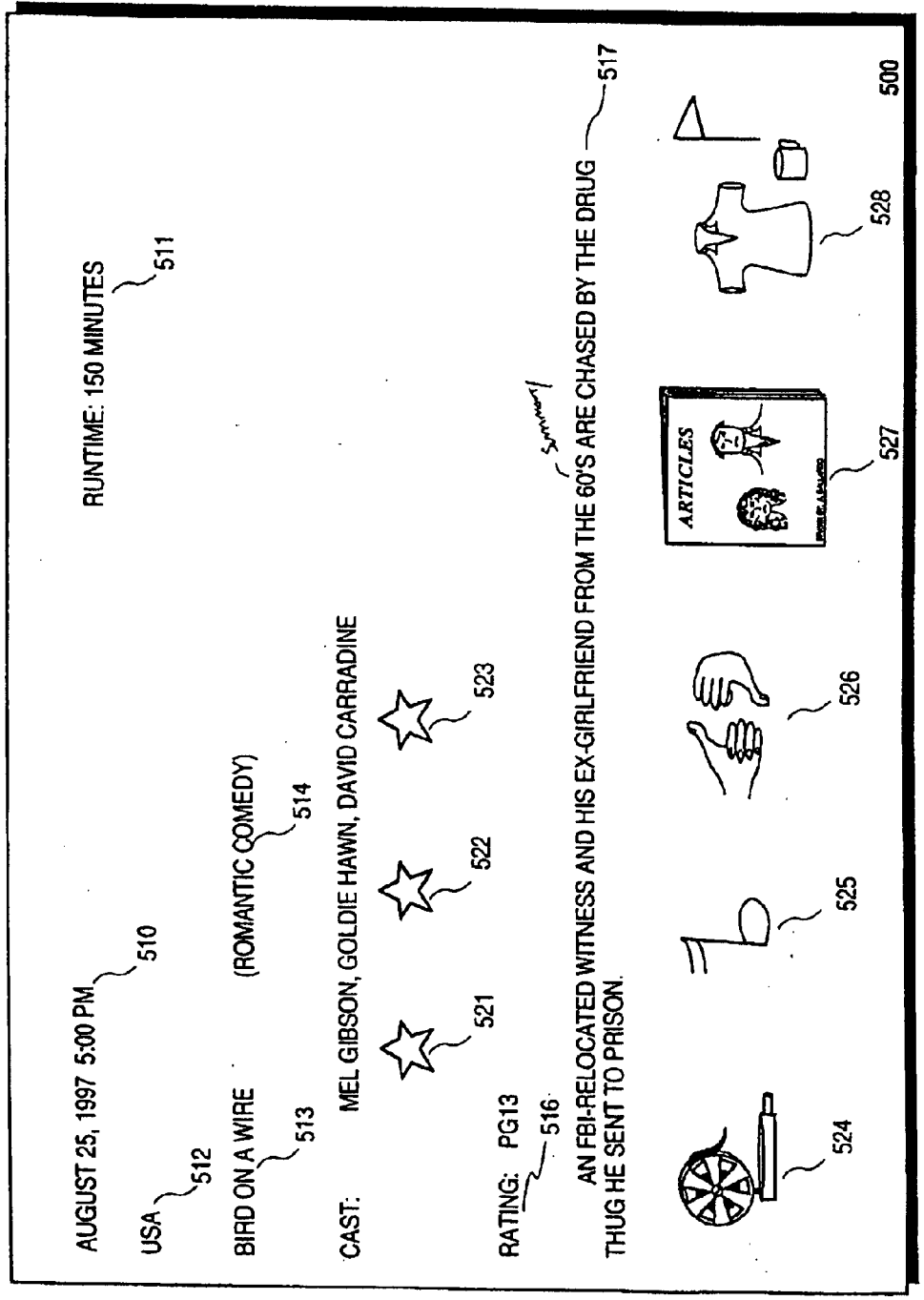
FIG. 5 illustrates a graphical user interface according to a first embodiment of the present invention.

FIG. 5 illustrates one example of a graphical user interface according to a first embodiment of the present invention. The graphical user interface 500 displays a plurality of entertainment system data corresponding to an entertainment selection. According to this example, the graphical user interface 500 displays a plurality of entertainment system data in text form. Entertainment system data 510–517 include information about the name of an entertainment selection, the time the entertainment selection is broadcasted, the source of the entertainment selection, the runtime of the entertainment selection, the category and rating of the selection, the cast of the entertainment selection, and a summary of the selection. According to an embodiment of the present invention, the name of the entertainment selection is displayed at a selection listing area, the time the entertainment selection is broadcasted is displayed at a time heading, and the source of the entertainment selection is displayed at a source heading.

The graphical user interface 500 also includes a plurality of user selectable multimedia interfaces 521–528. The multimedia interfaces 521–528 may be graphical images that represent identifiers of traits which they represent. The multimedia interfaces 521–528 may also be displayed next to words which are related to the identifiers of traits which they represent. When selected, the query interface 313 (shown in FIG. 3) retrieves entertainment system data associated with the multimedia identifier and displays the entertainment system data to the user.

As an example, multimedia identifiers 521–523 are star shaped graphical images displayed next to the cast members of the entertainment selection. When selected, the query interface 313 may retrieve entertainment system data related to the cast members of the entertainment selection. The entertainment system data may be a text biography of the cast member, a web page of the cast member, an image, a video clip, or other entertainment system data related to the cast member. Multimedia identifier 524 is a graphical image of two movie reels. When selected, the query interface 313 may retrieve entertainment system data that include a video trailer of the entertainment selection and play the trailer. Multimedia identifier 525 is graphical image of a musical note. When selected, the query interface 313 may retrieve entertainment system data that include a theme song for the entertainment selection and play the theme song. Multimedia identifier 526 is graphical image of two hands giving a "thumbs-up" and a "thumbs-down". When selected, the query interface 313 may retrieve entertainment system data that include critiques of the entertainment selection. Multimedia identifier 527 is a graphical image of a magazine. When selected, the query interface 313 may retrieve entertainment system data that include articles written about the entertainment selection. Multimedia identifier 528 is a graphical image of a shirt, a cup, and a pennant. When selected, the query interface 313 may retrieve entertainment system data that include merchandise related to the entertainment selection that may be purchased.

It should be appreciated that the entertainment system data retrieved by the query interface 313 may reside in a plurality of locations. For example, entertainment system data relating to articles written about the entertainment selection may reside at a first location such as on a web server at a location remote to the entertainment system 100 (shown in FIG. 1) while entertainment system data relating to the theme song may reside at a second location such as on a compact disk stored in a compact disk player 126 (shown in FIG. 1) in the entertainment system 100. The query interface 313 is configured to access the entertainment system data related to a selected multimedia identifier in the database 320 or at a location stored in the database 320.

The multimedia interfaces 521–528 are shown to be graphical images. It should be appreciated that the multimedia interfaces 521–528 shown in FIG. 5 are only examples and that according to the present invention, the multimedia identifiers may be configured to represent any image according to any shape or size. It should also be appreciated that the multimedia identifiers may be configured to be an animation, an audio clip, or other multimedia identifiers. The multimedia identifiers display entertainment system data in a friendly and intuitive format in contrast to its static text counterparts.

Figure 6:
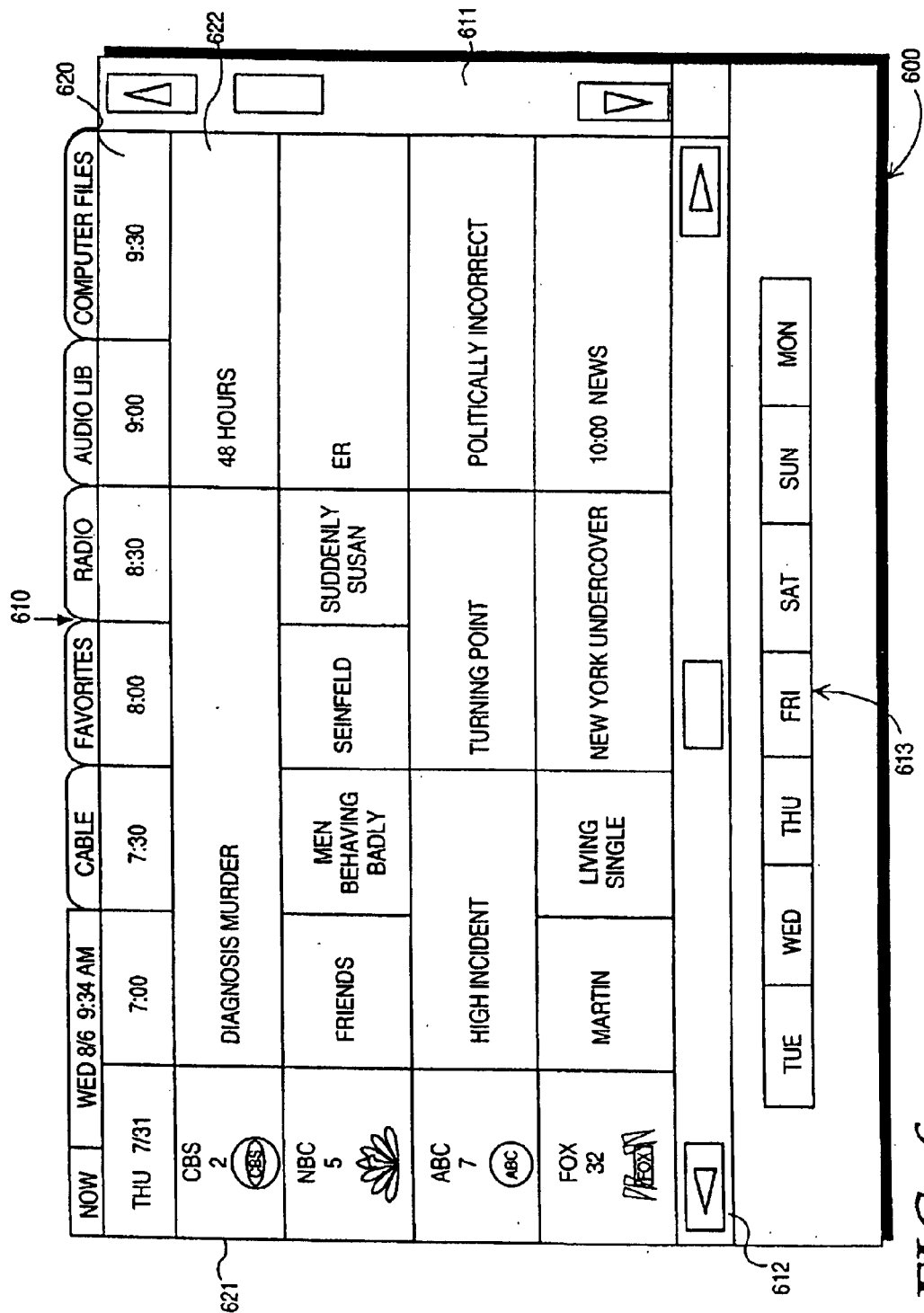
FIG. 6 illustrates a graphical user interface according to a second embodiment of the present invention.

FIG. 6 illustrates an example of a graphical user interface according to another embodiment of the present invention. The graphical user interface 600 includes an entertainment category display section 610 that lists the categories of entertainment system data that may be displayed by the graphical user interface 600. The graphical user interface shown in FIG. 6 is configured to display entertainment system data corresponding to the user's pre-set favorite television channels. The graphical user interface 600 includes a selection listing area 622 that displays the names of entertainment selections that are broadcasted, a time heading 620 that displays the times that the entertainment selections are broadcasted, and a source heading 621 that displays the sources of the entertainment selections in a grid format. The graphical user interface 600 also includes scroll bars 611 and 612 and a day of the week selection bar to allow a user to browse the entertainment system data stored in the database 320.

According to an embodiment of the present invention, sections of the selection listing area 622 corresponding to an entertainment selection may be selected by a user. When selected, the query interface 313 generates a second graphical user interface similar to the graphical user interface shown in FIG. 5 to display to the user. The second graphical user interface may display additional entertainment system data relating to the entertainment selection and include multimedia identifiers that are selectable to retrieve additional entertainment system data. It should be appreciated that the graphical user interface 600 may also include multimedia identifiers that are selectable to retrieve additional entertainment system data related to an entertainment selection.

Figure 7:
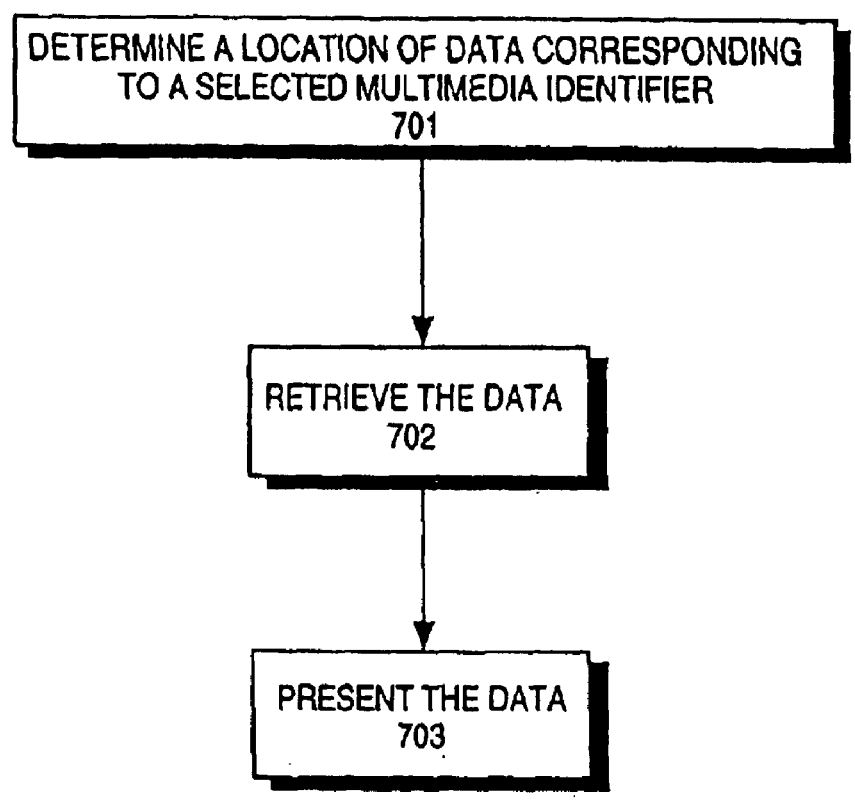
FIG. 7 is a flow chart illustrating a method for managing entertainment system data according to an embodiment of the present invention.

FIG. 7 is a flow chart that illustrates a method for managing entertainment system data according to an embodiment of the present invention. At step 701, a location of the entertainment system data corresponding to a multimedia identifier that is selected is determined. According to an embodiment of the present invention, the selected multimedia identifier corresponds to an identifier portion in a record stored in a database of entertainment system data. The entertainment system data corresponding to the multimedia identifier may be stored in a data portion in that record or at a location written in the data portion of the record.

At step 702, the entertainment system data corresponding to the selected multimedia identifier is retrieved. The entertainment system data corresponding to the selected multimedia identifier may be retrieved from the data portion of the record in the database or at the location indicated by the pointer stored in the data portion of the database. It should be appreciated that the location may be a remote web server or a local storage medium.

At step 703, the entertainment system data is presented. According to an embodiment of the present invention, the entertainment system data may be text or graphical data that may be displayed on a television or monitor. According to another embodiment of the present invention, the entertainment system data may be audio data that may be played on a speaker system.

In the foregoing specification, the invention has been described with references to specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A method for managing television program information in an entertainment system comprising:
   receiving broadcast television programming from a broadcast source;
   presenting a television programming guide to a user, the television programming guide showing a plurality of different television programs on each of a plurality of different television channels, data to support the television programming guide being stored in a location local to the entertainment system;
   upon selection of a particular one of the television programs of the television programming guide, presenting television program data about the selected television program;
   presenting a multimedia identifier to the user within the television programming guide together with the television program data, the multimedia identifier being associated with further data about the selected television program;
   determining a location of the further television program data corresponding to the multimedia identifier upon the multimedia identifier being selected by the user;
   retrieving the further television program data corresponding to the selected multimedia identifier from a location remote from the storage location of the television programming guide and separate from the broadcast source; and
   presenting the further television program data to the user at the entertainment system within the television programming guide.

2. The method of claim 1, wherein retrieving the further television program data comprises retrieving the further television program data from a remote web server.

3. The method of claim 2, further comprising obtaining the television programming guide by the entertainment system from a broadcast source different from the remote web server.

4. The method of claim 1, wherein retrieving the further television program data comprises retrieving the further television program data from a component of the entertainment system.

5. The method of claim 1, wherein the selected multimedia identifier corresponds to an identifier portion in a record stored in a database at the storage location of the television programming guide.

6. The method of claim 5, wherein the further television program data is stored in a location written in a data portion of the record.

7. The method of claim 6, wherein retrieving the further television program data comprises retrieving the further television program data at the location written in the data portion of the record.

8. The method of claim 6, wherein the storage location of the television programming guide is at the entertainment system and the location written in the data portion of the record is a remote web server.

9. The method of claim 1, wherein the further television program data is at least one of text, graphical data, and audio data.

10. The method of claim 1, wherein presenting the multimedia identifier comprises presenting the multimedia identifier to the user as a graphical image.

11. The method of claim 1, wherein the television programming guide presents the name, and source of the particular television program together with the multimedia identifier.

12. The method of claim 1, further comprising presenting a second multimedia identifier to the user within the television programming guide together with the first multimedia identifier, the second multimedia identifier being associated with other data about the particular television program, the other television program data corresponding to the second multimedia identifier being stored in a database at the storage location of the television programming guide and retrievable from the database upon the second multimedia identifier being selected by the user.

13. A machine-readable medium having stored thereon data representing instructions which, when executed by a machine, cause the machine to perform operations comprising:
   receiving broadcast television programming from a broadcast source;
   presenting a television programming guide to a user, the television programming guide showing a plurality of different television programs on each of a plurality of different television channels, data to support the television programming guide being stored in a location local to the entertainment system;
   upon selection of a particular one of the television programs of the television programming guide, presenting television program data about the selected television program;
   presenting a multimedia identifier to the user within the television programming guide together with the television program data, the multimedia identifier being associated with further data about the selected television program;
   determining a location of the further television program data corresponding to the multimedia identifier upon the multimedia identifier being selected by the user;
   retrieving the further television program data corresponding to the selected multimedia identifier from a location remote from the storage location of the television programming guide and separate from the broadcast source; and
   presenting the further television program data to the user at the entertainment system within the television programming guide.

14. The medium of claim 13, wherein the instructions for retrieving the further television program data comprise instructions for retrieving the further television program data from a remote web server.

15. The medium of claim 14, further comprising instructions for obtaining the television programming guide from a broadcast source different from the remote web server.

16. The medium of claim 13, wherein the instructions for retrieving the further television program data comprise instructions for retrieving the further television program data from a component of the entertainment system.

17. The medium of claim 13, wherein the instructions for presenting the multimedia identifier comprise instructions for presenting the multimedia identifier to the user as a graphical image.

18. The medium of claim 13, further comprising instructions for presenting the name, and source of the particular television program together with the multimedia identifier.

19. The medium of claim 13, further comprising instructions for presenting a second multimedia identifier to the user within the television programming guide together with the first multimedia identifier, the second multimedia identifier being associated with other data about the particular television program, the other television program data corresponding to the second multimedia identifier being stored in a database at the storage location of the television programming guide and retrievable from the database upon the second multimedia identifier being selected by the user.

20. An apparatus for presenting data associated with a television program in a television programming guide comprising:
 a data parser to receive television programming guide data and to reformat it for local storage, the data format including an identifier portion to provide a generic description of the data and a data portion to provide specific information related to the data, the specific information including, for at least a portion of the data, an identification of a remote source, separate from the source of the television programming and the television programming guide data and from which further television program data is retrievable;
 a data engine to receive the reformatted television programming guide data from the parser and store the reformatted television programming guide data in a local database; and
 a graphical query interface to access the reformatted television guide programming data stored in the database, to present a television programming guide using the television programming guide data, the television programming guide showing a plurality of different television programs on each of a plurality of different television channels, upon selection of a particular one of the television programs of the television programming guide, to present television program data about the selected television program together with one or more selectable multimedia identifiers, and to retrieve the further television program data from the identified remote source, upon selection of a corresponding multimedia identifier.

21. The apparatus of claim 20 wherein the data parser is further to receive the television programming guide data from a plurality of different sources in a plurality of different multimedia data formats, and to reformat the television programming data into a unitary data format.

22. The apparatus of claim 20 wherein the data parser is further to receive the television programming guide data from the broadcast source only.

23. The apparatus of claim 20, wherein the data portion for the at least a portion of the data includes a uniform resource locator (URL) associated with the remote source of the data.

24. The apparatus of claim 20, wherein each of the one or more selectable multimedia identifiers is selectable to deliver one of a critique of the entertainment selection to be rendered, a theme song of the entertainment selection to be rendered, and a video clip of the entertainment selection to be rendered.

25. The apparatus of claim 20 wherein the television program data comprises at least one of the name of the show, the time that the show will be broadcast, a list of cast members of the show, a summary of the show, a text biography of a cast member of the show, a web page for the show, a video clip of the show, a theme song of the show, a critique of the show, a magazine article about the show and merchandise related to the show.

26. A system controller for an entertainment system comprising:
 an audio/video tuner to receive broadcast television programming from a broadcast source;
 a data parser to receive television programming guide data from the broadcast source and to reformat it for local storage, the data format including an identifier portion to provide a generic description of the data and a data portion to provide specific information related to the data, the specific information including, for at least a portion of the data, a an identification of a remote source, separate from the broadcast source from which further television program data is retrievable;
 a data engine to receive the reformatted television programming guide data from the parser and store the reformatted television programming guide data in a local database; and
 a graphical query interface to access the reformatted television guide programming data stored in the database, to present a television programming guide using the television programming guide data, the television programming guide showing a plurality of different television programs on each of a plurality of different television channels, upon selection of a particular one of the television programs of the television programming guide, to present television program data about the selected television program together with one or more selectable multimedia identifiers, and to retrieve the further television program data from the identified remote source, upon selection of a corresponding multimedia identifier.

27. The apparatus of claim 26, wherein the data portion for the at least a portion of the data includes a uniform resource locator (URL) associated with the remote source of the data.

* * * * *